(12) United States Patent
Vissers et al.

(10) Patent No.: US 8,469,598 B2
(45) Date of Patent: Jun. 25, 2013

(54) BEARING UNIT

(75) Inventors: Cornelius Petrus Antonius Vissers, Den Dungen (NL); Hendrikus Jan Kapaan, Utrecht (NL)

(73) Assignee: Aktiebolaget SKF, Göteborg (SE)

( * ) Notice: Subject to any disclaimer, the term of this patent is extended or adjusted under 35 U.S.C. 154(b) by 162 days.

(21) Appl. No.: 13/132,548

(22) PCT Filed: Dec. 2, 2008

(86) PCT No.: PCT/EP2008/010199
§ 371 (c)(1),
(2), (4) Date: Jun. 2, 2011

(87) PCT Pub. No.: WO2010/063299
PCT Pub. Date: Jun. 10, 2010

(65) Prior Publication Data
US 2011/0235957 A1 Sep. 29, 2011

(51) Int. Cl.
*F16C 13/00* (2006.01)
*F16C 35/00* (2006.01)
*F16C 43/04* (2006.01)

(52) U.S. Cl.
USPC .......................... 384/544; 384/537; 384/584

(58) Field of Classification Search
USPC ................ 384/492, 493, 513, 537, 538, 544, 384/557, 584, 585, 589
See application file for complete search history.

(56) References Cited

U.S. PATENT DOCUMENTS

| | | | | |
|---|---|---|---|---|
| 2,506,278 A | * | 5/1950 | Ristow | 384/584 |
| 5,079,825 A | | 1/1992 | Matsui et al. | |
| 6,142,675 A | * | 11/2000 | Brandenstein et al. | 384/537 |
| 6,715,925 B2 | * | 4/2004 | Pairone et al. | 384/536 |
| 2008/0118394 A1 | | 5/2008 | Wessen et al. | |
| 2010/0215296 A1 | | 8/2010 | Dahlman | |

FOREIGN PATENT DOCUMENTS

| | | |
|---|---|---|
| DE | 4023016 A1 | 1/1992 |
| GB | 1510546 A | 5/1978 |
| JP | 626525 A | 2/1994 |
| JP | 200785393 A | 4/2007 |
| SE | 530892 C2 | 10/2008 |

* cited by examiner

*Primary Examiner* — Phillip A Johnson
(74) *Attorney, Agent, or Firm* — Mark A. Ussai; Bryan Peckjian (57) ABSTRACT

The present invention resides in a wheel bearing unit (100) having an inner member (105) and an outer member (107) rotationally coupled to each other by at least one row of rolling elements (115), whereby at least one bearing inner ring (110) is mounted on the inner member (105). The inner member (105) comprises a first section (130) and a second section (135) that at least party lies radially inward of the first section (130). According to the invention, the first section (130) is formed from a first material and the second section (135) is formed from a metal material, preferably a lightweight metal such as aluminum. The second section (135) of the inner member (105) is joined to the first section (130) by means of a semi-solid metal process, and to ensure a radial interlock between the first and second sections (130, 135), the first section comprises a portion (140) extending in a radially inward direction, wherein the portion presents at least one surface that faces away from the bearing axis of rotation (X). Thus, as the semi-solid metal of the second section (135) cools, it has a surface against which to radially contract, thereby ensuring a permanent join and long service life of the unit (100).

18 Claims, 8 Drawing Sheets

BEARING UNIT

FIELD OF THE INVENTION

The present invention relates to a bearing unit, especially a bearing unit suitable for supporting a wheel in a vehicle, wherein an element of the bearing unit comprises a first section and a second section that are joined by means of a semi-solid metal process.

BACKGROUND TO THE INVENTION

In the interests of fuel economy, there is an increasing drive within the automotive industry towards weight reduction of the component parts of vehicles. However, the weight reduction needs to be achieved without compromising the necessary strength or robustness of the components and, preferably, without increasing material costs or manufacturing costs.

A vehicle wheel bearing is an example of an automotive component where weight reduction is desirable, also in view of the fact that the wheel bearings belong to the unsprung weight of a vehicle. Raceways of the bearings need to be made from a material of sufficient hardness in order to withstand the stresses of rolling contact. Titanium and certain ceramics are materials that possess the necessary mechanical properties and are also low in weight. They are also expensive and, consequently, bearing steel is more commonly used. Bearing steel has excellent hardenability but cannot be viewed as a lightweight material. Thus, one solution for obtaining a wheel bearing that is relatively cheap to manufacture and reduced in weight is to form the bearing rings from bearing steel and to form further structural elements of the wheel bearing from a lightweight material.

In SE530892, a bearing unit is suggested that has inner and outer bearing rings made from first and second materials. The first material of the bearing rings can be a bearing steel, which serves as raceways for rolling elements, and the second material is joined to the first material by a semi-solid metal process. The second material can be a lightweight metal in order to maximise the potential for weight reduction.

There is still room for improvement, however, in terms of realizing a lightweight bearing unit that is capable of delivering the same mechanical and structural performance as a conventional unit made entirely from e.g. a bearing steel.

SUMMARY OF THE INVENTION

The present invention resides in a bearing unit having an inner member and an outer member, rotationally coupled to each other by at least one row of rolling elements. The bearing unit further comprises at least one bearing inner ring that is mounted on the inner member, whereby the inner ring has at least part of an inner raceway for rolling elements. To enable weight reduction, the inner member comprises a first section formed from a first material and further comprises a second section formed from a metal material; preferably a lightweight metal such as aluminium. The second section at least party lies radially inward of the first section and is joined to the first section by means of a semi-solid metal process. In order to radially interlock the first and second sections of the inner member, the first section comprises a portion extending in a radially inward direction and forming an interface with the second section, wherein the portion presents at least one surface which faces away from an axis of rotation of the bearing unit.

Consequently, the inwardly extending portion of the first section comprises at least one overhanging surface, relative to an undercut surface of the first section. In other words, the inwardly extending portion has a maximum axial width that is greater than the axial width at its base. This is essential in view of the semi-solid metal process that is used to join the first and second sections. With the aid of a suitable die, the second section of the inner member is formed (at least partly) within the first section, when the metal material of the second section is in a semi-solid state. As it cools, the semi-solid metal solidifies and shrinks, leading to contraction in a radially inward direction. The overhanging surface of the portion ensures that the second section has a surface against which the semi-solid metal can radially contract, thereby radially locking the first and second sections. Preferably, the portion comprises a second overhanging surface, to increase the surface area against which the cooling metal can contract and enhance the radial interlocking. The inwardly extending portion also serves to axially lock the first and second sections in both directions.

In a first embodiment of the invention, only one bearing inner ring is mounted on the inner member. If the bearing unit is a single-row bearing, the bearing inner ring comprises a surface that serves as part of the inner raceway for the rolling elements. The remaining part of the inner raceway is formed on a surface of the first section. If the bearing unit is a double-row bearing, the bearing inner ring has an inner raceway for a first row of rolling elements and the inner member additionally comprises a surface that serves as an inner raceway for a second row of rolling elements. In the first embodiment of the invention, the first section of the inner member incorporates a raceway surface and is thus advantageously formed from a bearing grade steel. After the second section has been joined to the first section, the inner raceway surface on the first section is given the necessary hardness by means of e.g. induction hardening. Other suitable materials for the first section are titanium or titanium alloys and ceramic materials such as silicon nitride, zirconium oxide, aluminium oxide, borium carbide, borium nitride, aluminium nitride or silicon carbide. The advantage of the first embodiment is that the first section provides the inner member with excellent strength and stiffness properties.

In a second embodiment of the invention, more than one bearing inner ring is mounted on the first section of the inner member. If the bearing unit is a single-row bearing, two split bearing inner rings define the inner raceway for the rolling elements. If the bearing unit is a double-row bearing, a first and a second bearing inner ring define a first and second inner raceway for a first and second row of rolling elements. The advantage of the second embodiment of the invention is that because the first section of the inner member does not comprise a raceway surface, the first section need not undergo a hardening process. The first section can therefore be made from a material with excellent formability, making it easier and less expensive to form the required shape of the first section. A low-carbon steel and aluminium are examples of suitable materials. Low-carbon steels have the further advantage of being weldable under defined conditions In both embodiments of the invention, the at least one bearing inner ring mounted on the inner member can be formed from a bearing grade steel, a ceramics material or from titanium or a titanium alloy, and the metal material of the second section is preferably aluminium or an aluminium alloy.

To achieve a further weight reduction, a bearing unit according to the invention can also comprise a bearing outer ring (outer member) having a first section and a second section that are joined by means of a semi-solid metal process, the second section lying radially outward of the first section.

Thus, the first section has a surface that serves as an outer raceway for the rolling elements and, as described for the inner member, the first section of the bearing outer ring can be formed from a bearing grade steel, a ceramics material or titanium. The second section of the bearing outer ring is formed from a lightweight metal such as aluminium or an aluminium alloy.

In some examples of a bearing unit according to the invention, the bearing unit is adapted for inner ring rotation and the second section of the inner member comprises a radially extending flange at an outboard side, to serve as a mounting flange for a rotatable component such as a vehicle wheel. The first section of the inner member may then advantageously comprise a corresponding flange portion extending in a radially outward direction. During the semi-solid metal process, the flange portion of the second section is formed around the flange portion of the first section, and the flange portion of the first section enhances the stiffness of the mounting flange as a whole.

In other examples of a bearing unit according to the invention, the bearing is adapted for outer ring rotation and the second section of the inner member comprises a radially extending flange at an inboard side, to enable the bearing unit to be fastened to a fixed machine part, e.g. a vehicle suspension component.

Likewise, in embodiments of the invention where the bearing outer ring also comprises a first section and a second section and the bearing is adapted for outer ring rotation, the second section of the outer ring may comprise a radially extending flange at an outboard side to enable the attachment of a rotating component such as a vehicle wheel. When the bearing is adapted for inner ring rotation, the second section of the bearing outer ring can comprise an inboard flange, for attachment of the bearing unit to e.g. a vehicle suspension component.

In a further development of the invention, the bearing unit is a wheel bearing unit in which a vehicle suspension component is formed and joined to the first section of the bearing outer ring by means of a semi-solid metal process. The suspension component can be adapted for a non-steerable vehicle wheel or can be a steering knuckle. Thus, the second section of the outer ring comprises the steering knuckle or the non-steerable suspension component, which has the advantage of further reducing the weight of the wheel end as a whole and also simplifies the vehicle assembly process.

As an additional weight-reducing measure, the one or more flanges in a flanged bearing unit according to the invention can have a non-circular, discrete outer circumference.

In a further development of a wheel bearing unit according to the invention, the outboard flange (of the inner member or of the bearing outer ring) that serves as a wheel mounting flange comprises a stiffening rib. The stiffening rib consists of an annular axial extension that protrudes from the flange in an inboard direction, at a circumferential periphery of the flange. The rib increases the bending stiffness of the wheel mounting flange, which is required for the structural strength of the wheel-end assembly.

In a further development of the invention, the outboard flange (of the inner member or of the bearing outer ring) comprises a first radial extension and a second radial extension, connected by a cylindrical portion. The first radial extension serves a wheel mounting flange and the second radial extension serves as a brake rotor, which reduces the number of assembly parts when the vehicle wheel end is assembled.

In a still further development of a wheel bearing unit according to the invention that is adapted for driven inner ring rotation, the second section of the inner member has a non-circular bore. Thus, a drive element (e.g. the outboard shaft of a constant velocity joint) with a corresponding non-circular shape can transfer torque to the inner member and the at least one bearing inner ring. The advantage of a non-circular bore in combination with a flanged inner member that is partly formed from a lightweight metal such as aluminium is that the non-circular shape gives added stiffness to the inner member.

As will be understood, a bearing unit must possess sufficient strength and stiffness for the application requirements. The second section of the inner member and the second section of the bearing outer ring are formed and joined to the respective first section by means of a semi-solid metal process. A semi-solid metal process is a near net shape process in which a metal or metal alloy is formed at a temperature between its liquidus and solidus temperature. A further fundamental aspect is that the semi-solid metal or metal slurry has thixotropic properties, meaning that the viscosity of the metal slurry decreases when it is subjected to shearing.

In a conventional molten metal process such as casting, the microstructure of the cast metal or metal alloy contains interlocking dendrites that result in material brittleness. In a semi-solid metal process, by contrast, spherical grains are formed, and the metal has fine, uniform microstructures that give enhanced mechanical properties. Semi-solid metal processing is also less susceptible to air entrapment and a component produced in this way has fewer defects and lower porosity than e.g. a cast component.

According to the invention, the semi-solid metal process used to join the first and second sections of the inner member is one of a thixoforming process, a thixocasting process, a thixoforging process, a thixojoining process, a rheoforming process, a rheocasting process, a rheoforging process, or a rheojoining process. The first and second sections of the bearing outer ring can also be joined by means of one of the aforementioned processes. Preferably, the same semi-solid metal process is applied to join the first and second section of the inner member and of the bearing outer ring, although embodiments are conceivable in which different processes are applied.

A preferred process for joining the first and second sections in a bearing unit according to the invention is a rheocasting process. A preferred rheocasting process is described in US2008/0118394, the contents of which are hereby incorporated by reference.

A bearing unit according to the invention has numerous advantages. The design of the first section of the inner member means that the first and second sections are radially and axially locked, enabling a long service life of the bearing unit. The second section of the inner member (and of the bearing outer ring) can be accurately formed and provided with the required geometry, eliminating the need for subsequent machining processes. Also, when the bearing unit is a wheel bearing unit with wheel mounting flange formed from aluminium, electrochemical corrosion will not occur between the flange and an aluminium wheel rim mounted against the flange. Other advantages of the present invention will become apparent from the detailed description and accompanying drawings.

DESCRIPTION OF THE FIGURES

In the following, the invention is described with reference to the accompanying drawings, in which:

FIG. 1b shows an exploded view of a detail from FIG. 1a;

DETAILED DESCRIPTION OF THE INVENTION

Figure 1A:
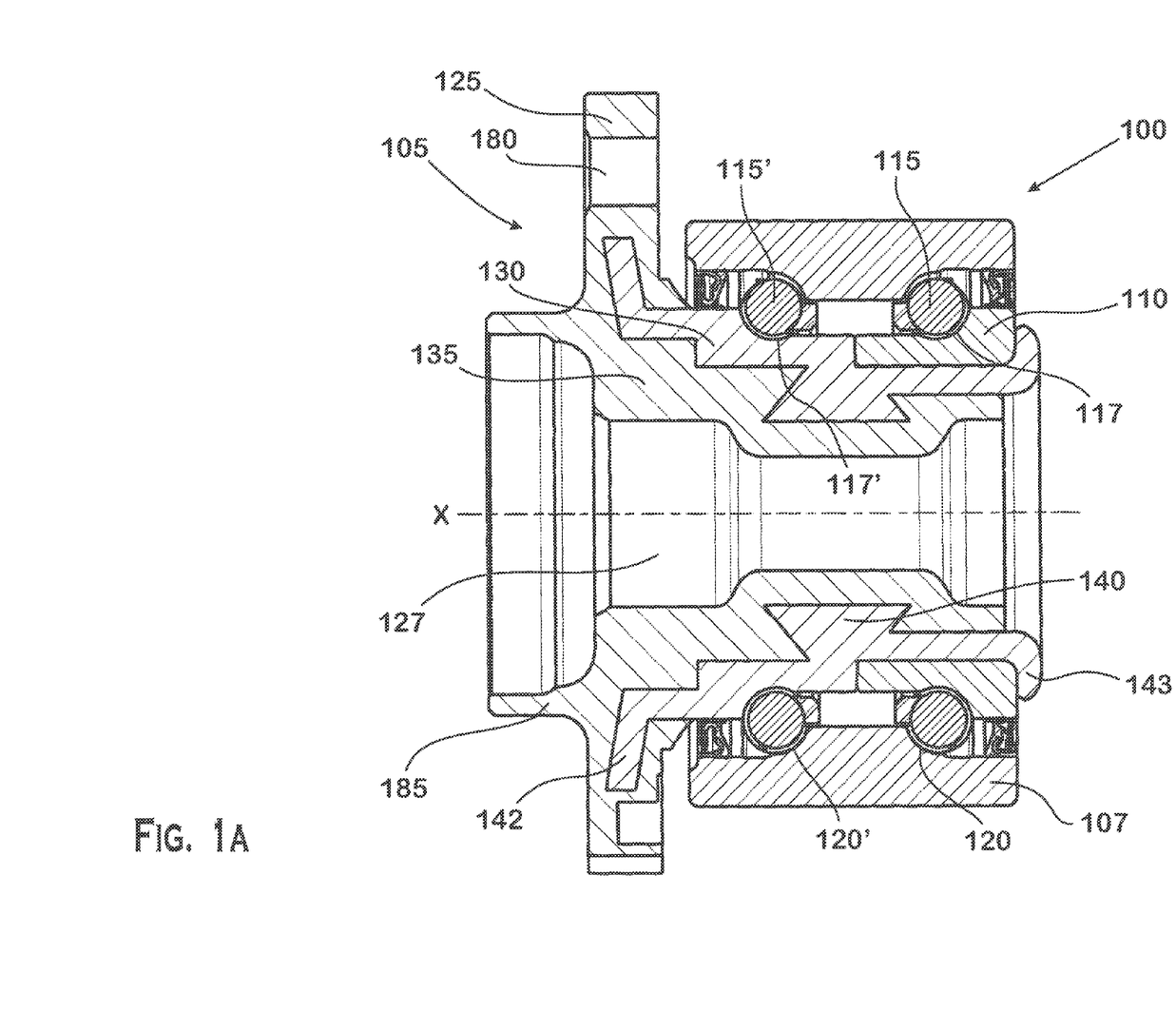
FIG. 1a shows a cross-sectional view of an example of a bearing unit according to a first embodiment of the invention.

FIG. 1 shows a cross-sectional view of an example of a first embodiment of a bearing unit according to the invention. The unit 100 in this example is a double-row angular contact bearing for vehicle applications that is designed to enable a vehicle wheel to be rotationally supported relative to a fixed suspension component of the vehicle. The unit 100 comprises a bearing outer ring 107 that is adapted to be attached to the vehicle suspension component. The unit 100 further comprises an inner member 105 having a radially extending flange 125 at an outboard side, the flange 125 being provided with connections means 180 to allow the connection of the vehicle wheel. The connection means can be a plurality of threaded holes in the flange 125, or the flange can comprise e.g. stud bolts. The inner member 105 has a bore 127, to enable the unit 100 to be mounted on a shaft element, which can be a drive shaft or a non-driven shaft. In this example, the inner member 105 further comprises an axial extension at an outboard side, known as a spigot 185, which facilitates centering of the vehicle wheel. To enable the inner member 105 to rotate relative to the bearing outer ring 107, about an axis of rotation X, a first row 115 and a second row 115' of rolling elements are provided between corresponding first 120 and second 120' outer raceways on the bearing outer ring 107 and first 117 and second 117' inner raceways.

At least one bearing inner ring 110 is mounted on the inner member 105, the ring 110 having the first inner raceway 117 for the first (inboard) row of rolling elements 115. According to the first embodiment of the invention, the inner member 105 incorporates a surface that serves as the second inner raceway 117' for the second (outboard) row of rolling elements 115'. In order to achieve a reduction in weight relative to conventional wheel bearing units, the inner member 105 comprises a first section 130 and a second section 135, whereby the first section is formed from a first material and the second section is formed from a lightweight metal. Aluminium or an aluminium alloy is a preferred material for the second section 135. In the first embodiment, the first section 130 of the inner member 105 incorporates the second inner raceway 117' for the outboard row of rolling elements 115'. Thus, the first section 130 is made from a material that is suitable for use as a bearing raceway, for example, a bearing grade steel. The second section 135 of the inner member comprises the wheel-mounting flange 125, the spigot 185 and the bore 127. In some examples, the second section of the inner member comprises an integrally formed brake rotor.

According to the invention, the second section 135 of the inner member 105 is formed and joined to the first section 130 by means of a semi-solid metal process, which is a near net shape process in which the metal of the second section is formed at a temperature between its liquidus and solidus. The advantage of a semi-solid metal process with respect to a molten metal process, such as die casting, is that the second section 135 obtains a denser, dendrite-free microstructure, which has the strength, stiffness and crack-propagation resistance required for bearing applications. Also, the semi-solid metal process allows the second section 135 of the inner member to be accurately provided with the required shape. For example, the bore 127 can be formed with a particular drive geometry. The wheel-mounting flange 125 and spigot 185 can be formed with the necessary geometry to ensure sufficient stiffness. Moreover, the connection means 180 in the wheel mounting flange 125 can be provided during the semi-solid metal process, by forming the semi-solid metal of the second section 135 around appropriately positioned threaded nuts or stud bolts. Thus, the inner member 105 can be produced without the need for subsequent machining operations.

A rheocasting process is one example of a preferred semi-solid metal process. Using aluminium as an example of the lightweight metal according to the invention, a rheocasting process initially involves bringing the aluminium to a molten (liquid) state. The molten aluminium is then allowed to cool and is stirred during solidification to obtain a semi-solid slurry. The step of cooling can involve adding solid particles of aluminium to the molten material and, for enhanced efficiency, the solid particles can be added via a stirring mechanism. An exchange of enthalpy takes place between the liquid aluminium and the solid particles, which facilitates the formation of the slurry and can remove the need for external cooling. The semi-solid aluminium slurry is then (injection) moulded to the first section 130 of the inner member 105 with the aid of a suitable die that defines the required shape of the wheel bearing bore 127 and the wheel mounting flange 125.

As the semi-solid aluminium of the second section 135 cools and solidifies, its volume becomes less. Given that the second section 135 of the inner member 105 (and the bearing as a whole) is a solid of revolution, an inner circumference and an outer circumference of the second section decreases, meaning that contraction occurs in a radially inward direction, towards the axis of rotation X of the bearing unit 100. Thus, within the bearing bore 127, the semi-solid metal of the second section 135 contracts away from the first section 130. During use of the wheel bearing, such contraction could lead to relative movement between the first and second section of the inner member 105 and, over time, to separation. Obviously this risk must be eliminated in order to realise a lightweight wheel bearing that is sufficiently robust for long-term safe operation.

Figure 1B:
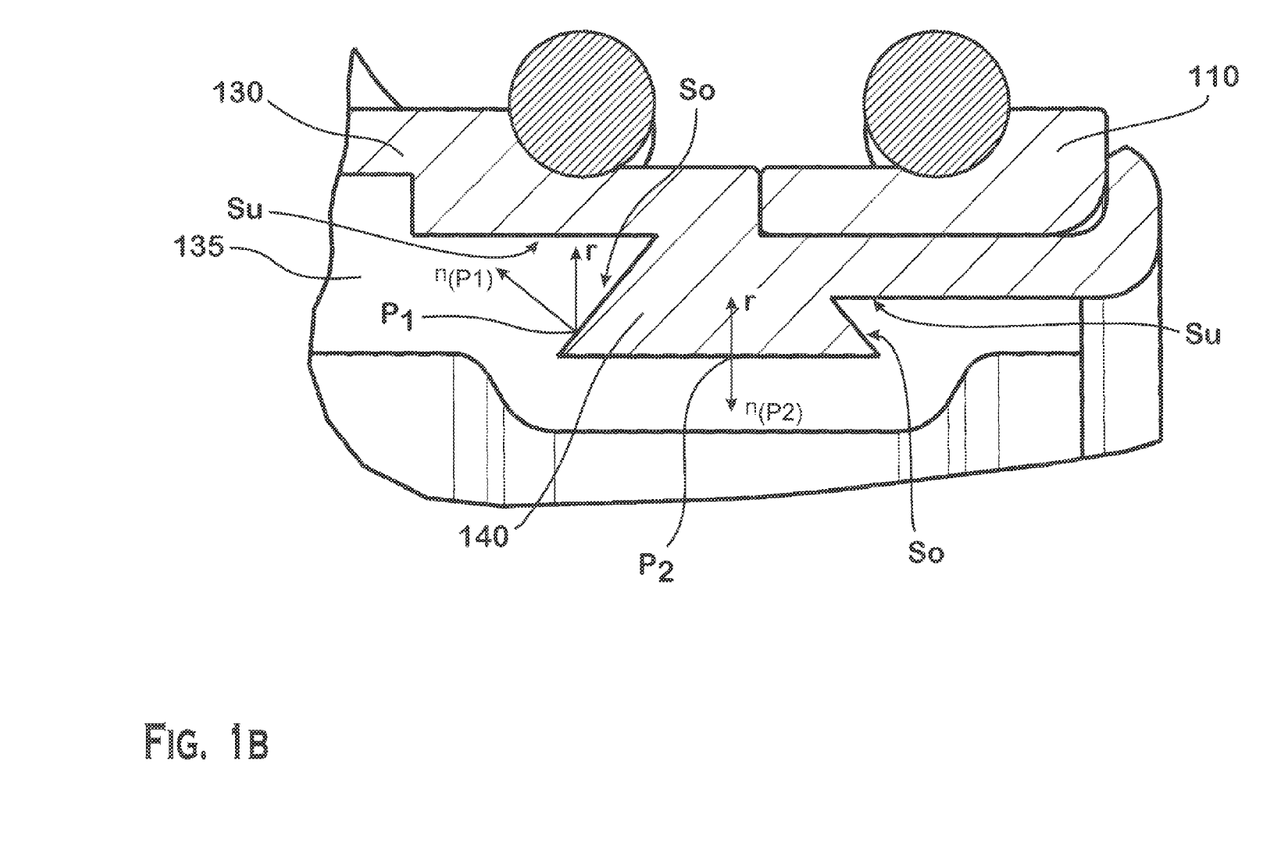

According to the invention, this problem is overcome in that the first section 130 of the inner member 105 comprises a radially inwardly extending portion 140 that presents at least one overhanging surface to a corresponding undercut surface of the first section, the overhanging surface lying radially inward of the undercut surface. An exploded cutaway view of the portion 140 is shown in FIG. 1b.

The first section 130 of the inner member comprises the portion 140, which extends in a radially inward direction relative to an undercut surface $S_U$ of the first section. According to the invention, the portion 140 presents at least one overhanging surface $S_O$ that faces away from the bearing axis of rotation.

Specifically, the overall surface of the portion 140 defines an interface between the first section 130 and the second section 135 of the inner member. If we define:

a normal vector n, which is normal to the interface in the direction of the first section to the second section, and a radial vector r, which is perpendicular to the bearing axis of rotation and positive in a radially outward direction, whereby the length of n and of r is set to the value 1, then a point p on the interface can be defined as lying on the overhanging surface $S_O$ when the scalar product of the normal vector at that point $n_{(p)}$ and of the radial vector r is greater than zero.

Thus, an overhanging surface $S_O$ of the interface comprises a collection of points p for which $$n_{(p)} \cdot r > 0.$$

In FIG. 1b, for the point $p_1$ on the overhanging surface $S_O$, the scalar product $n_{(p1)} \cdot r$ results in a positive value greater than zero. For the point $p_2$ on the portion 140, the scalar product $n_{(p2)} \cdot r$ results in a negative value.

The effect of the overhanging surface $S_O$ is that as the second section 135 of the inner member 105 cools and contracts in a radially inward direction, the solidifying metal has at least one surface $S_O$ against which to radially contract, resulting in a radial interlock between the first and second sections 130, 135 of the inner member 105. Advantageously, the first section 130 of the inner member 105 is preheated to maintain an appropriate shrink fit during solidification of the semi-solid metal, in view of the different thermal expansion coefficients of e.g. aluminium and steel.

The portion 140 also locks the first and second sections axially, which is a further advantage given that in operation, wheel bearing units are subject to thrust loads.

Preferably, the first section 130 of the inner member comprises a second undercut surface $S_U$ and a second overhanging surface $S_O$, to increase the available surface area against which the second section 135 can contract in a radially inward direction. With regard to simplicity of producing the first section, the second overhanging surface is preferably located with an axial displacement relative to the first overhanging surface. As will be understood, however, the second overhanging surface may be located radially inward of the first overhanging surface. The portion 140 may also comprise more than two overhanging surfaces.

In the example shown in FIG. 1b, the portion extends radially inwardly such that the overhanging surface $S_O$ is inclined with respect to the undercut surface $S_U$ at an angle of less than 90 degrees. In alternative examples, the portion 140 extends radially inwardly with an angle equal to or greater than 90 degrees and comprises at least one axial protrusion with an overhanging surface. In such embodiments, at least part of the overhanging surface faces in a radially outward direction.

The first section of the inner member not only provides a substrate for the overmoulded second section, it adds stiffness to the bearing unit as a whole. With reference to FIG. 1a, the first section preferably comprises a radial extension 142 at an outboard side, which provides added stiffness to the wheel mounting flange 125. Alternatively, a separate sheet metal flange, for example, could be joined to the first section 130 prior to the overmolding of the second section 135.

The first section 130 of the inner member 105 in a bearing unit according to the first embodiment of the invention comprises an inner raceway 117' (see FIG. 1a). As mentioned, a bearing grade steel is then a suitable material and the first section 130 may be formed in a forging operation. After the second section 135 of the inner member has been joined to the first section 130, the surface of the first section that serves as the inner raceway 117' is hardened by means of e.g. induction hardening, to enable the raceway surface to withstand the high stresses of rolling contact. In a subsequent step, the raceway surface can be ground to achieve the required surface properties and tolerances.

The first section 130 may further comprise an axial extension 143 at an inboard side, which axially protrudes beyond the second section 135. After the inner member 105 has been produced and the first row 115 and second row 115' of rolling elements have been assembled between the corresponding inner raceways 117, 117' and the outer raceways 120, 120' of the bearing unit 100, the axial extension 143 is orbitally formed against an inboard side face of the bearing inner ring 110, to lock up the bearing unit and provide the necessary bearing preload. In the example shown in FIG. 1a, the first section 105 of the inner member 105 comprises an extension that is orbitally formed. Alternatively, the second section of the inner member can comprise such an extension, as illustrated in FIG. 1c.

Figure 1C:
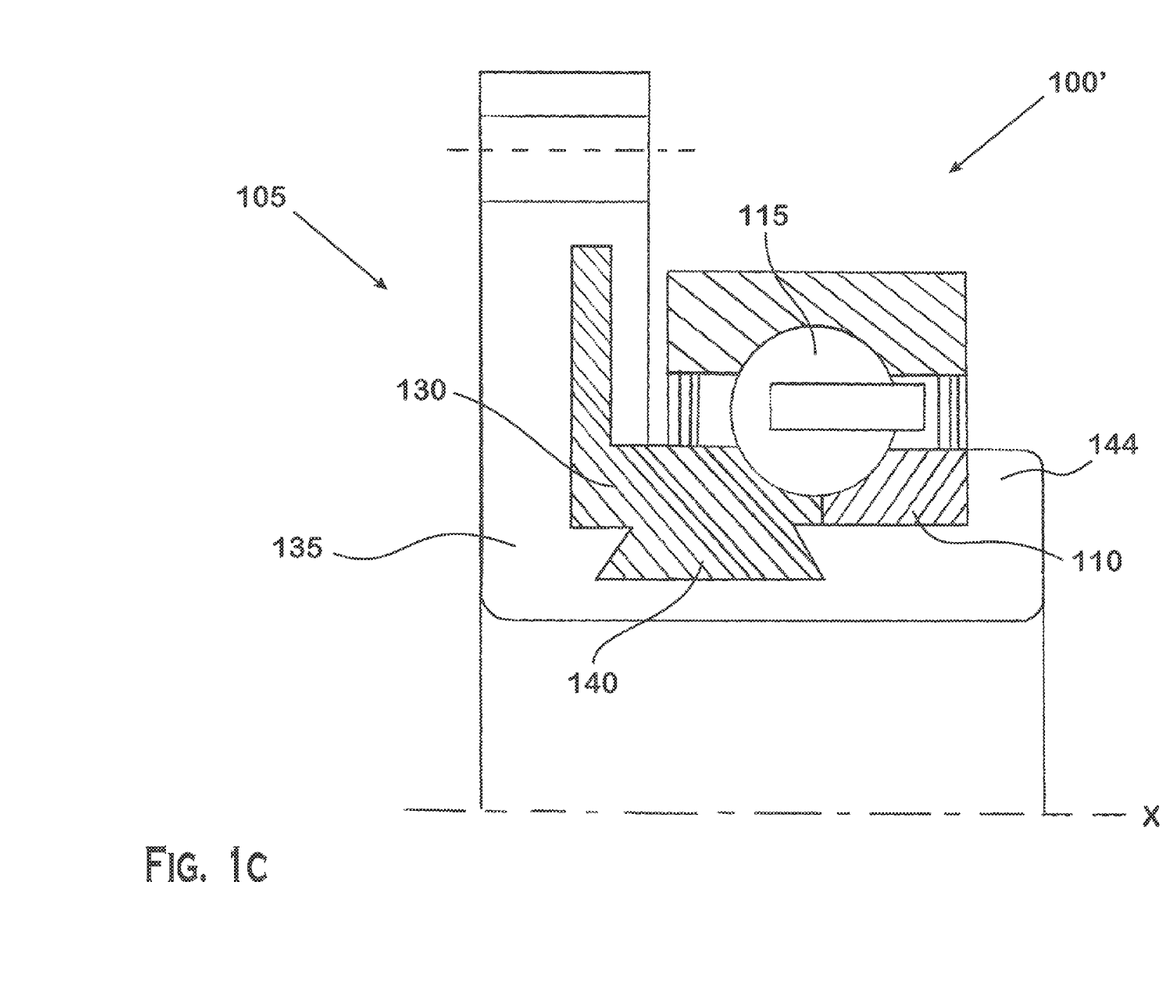
FIG. 1c shows a cross-sectional view of part of a single-row bearing unit according to the first embodiment of the invention.

FIG. 1c shows a cross-sectional view of part of a bearing unit according to the first embodiment of the invention in which the unit 100' is a single-row 4-point contact bearing. Again, the bearing unit 100' has an inner member 105 that comprises a first section 130 and a second section 135 radially interlocked by means of the portion 140. The separately mounted bearing inner ring 110 is a split bearing ring in this instance, and has a surface that serves as part of the inner raceway for the single row of rolling elements 115. The remaining part of the inner raceway is formed on the first section 130 of the inner member 105. As described previously, the final step in the assembly process is to lock up the bearing unit and provide the required bearing clearance. This is done by means of an axial extension 144 on the second section 135 of the inner member 105, which is orbitally formed against an inboard side face of the separately mounted inner ring 110.

The first section 130 can be a ceramic material, meaning that the first section is suitably produced in a sintering operation. A titanium first section is also possible. In most wheel bearing applications, titanium and ceramic raceways are prohibitively expensive, although are ideal in terms of weight reduction. A first section forged from bearing steel is more economical and provides the bearing unit with excellent strength and stiffness.

According to the invention, the first section 130 of the inner member 105 must have a specific geometry to ensure that after joining, the first and second sections are radially interlocked. A second embodiment of a bearing unit according to the invention allows the first section to be made from a material with better formability than bearing steel, thus enabling an even more economical production process.

Figure 2:
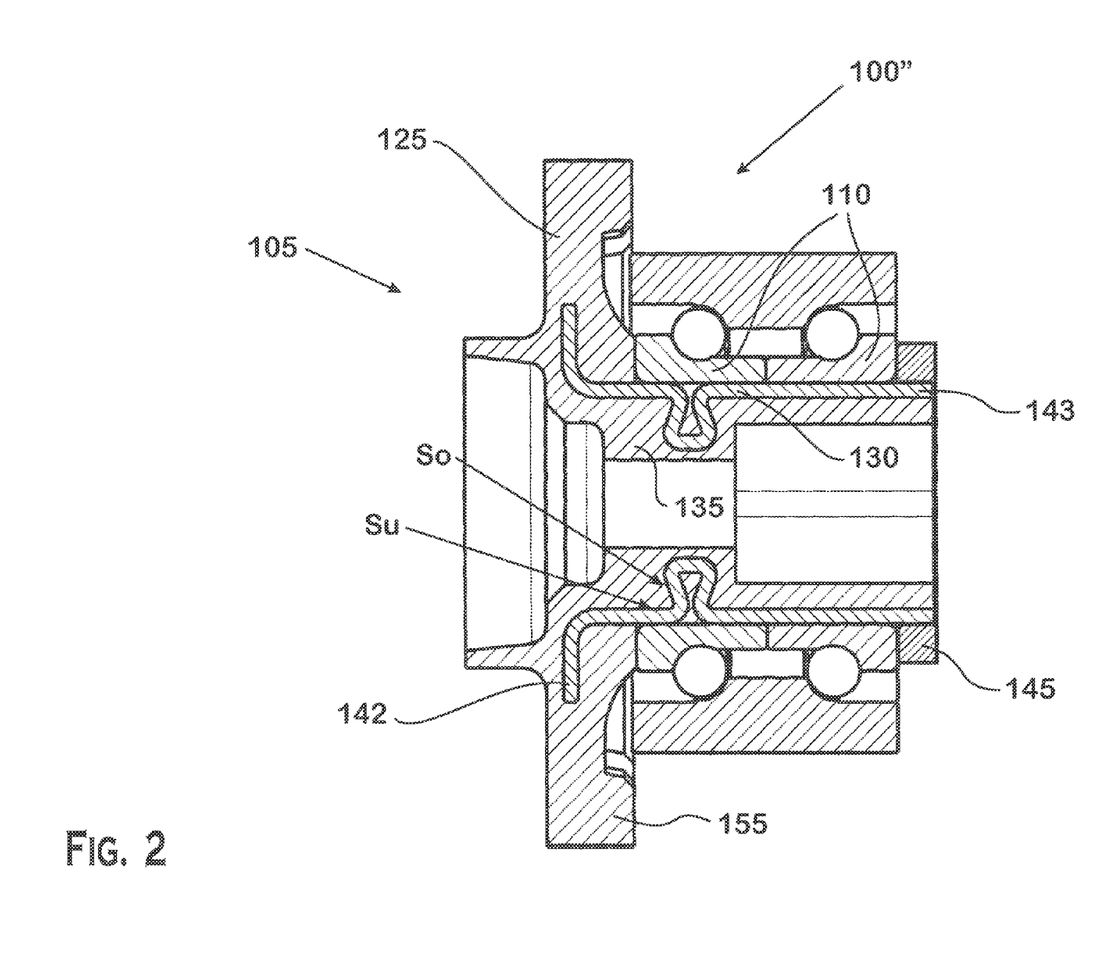
FIG. 2 shows a cross-sectional view of a bearing unit according to a second embodiment of the invention.

A second embodiment of a bearing unit according to the invention is shown in cross-section in FIG. 2. In this second embodiment, two bearing inner rings 110 are mounted on the first section 130 of the inner member 105, whereby the bearing inner rings can be part of a pre-assembled bearing assembly. The inner member 105 further comprises a second section 135 made of a lightweight metal that has been joined to the first section by means of a semi-solid metal process. As described previously, aluminium is a preferred material for the second section 135 and a rheocasting process is preferably used to join the first and second sections. To ensure a radial interlock between the first and second sections of the inner member 105, the first section 130 has a portion 140 extending radially inwardly and presents at least one overhanging surface $S_O$ relative to an undercut surface $S_U$ of the first section 130.

Because a pre-assembled bearing assembly is mounted on the first section 130 of the inner member 105, the first section does not need to be hardened and a material such as low-carbon steel can be used to form the first section 130 by means of e.g. a rolling operation or a forging operation. The excellent formability of the material makes it easier to produce the required geometry of the first section 130. Also, in contrast to bearing steel (high-carbon steel) low carbon steel has excellent weldability. In the embodiment shown in FIG. 2, the wheel bearing unit 100" is locked together and given the necessary preload using a locking ring 145. The locking ring can also be made from mild steel, which enables the ring 145 to be welded to the first section 130 of the inner member 105. Laser welding is an example of a preferred heat joining process, as it is fast, economical and easy to integrate in a production line environment. Alternatively, an inboard axial extension 143 of the first section 130 may be provided with a thread, to enable the locking ring 145 to be screwed on. Adhesive bonding is another option.

The first section 130 of the inner member 105 may also be formed from e.g. extruded aluminium. In this case, an orbital forming process is suitably applied to lock up the bearing unit 100", as described for the embodiment of FIG. 1a. Locking the bearing unit by means of orbital forming is also an option when the first section is made of low-carbon steel.

In the second embodiment, the first section 130 of the inner member 105 suitably comprises an integral or separately attached radial extension 142, to add to the stiffness of the wheel mounting flange 125. As a further means to enhance stiffness and prevent deformation of the wheel mounting flange, the second section 135 of the inner member 105 may comprise a stiffening rib 155. The rib 155 suitably consists of an axial protrusion at the flange circumference, extending in an inboard direction. Flange stiffness is particularly important in driven wheel applications, and for these applications, a wheel bearing unit according to the invention additionally comprises torque transfer means.

Figure 3A:
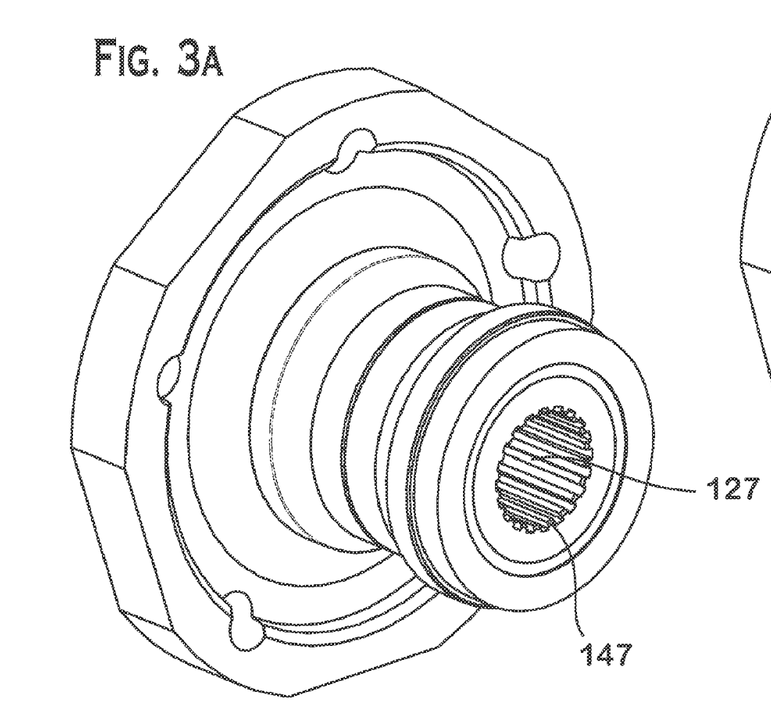
FIG. 3a, 3b show a perspective view from an inboard side of examples of a bearing unit according to the invention provided with a drive geometry.
Figure 3B:
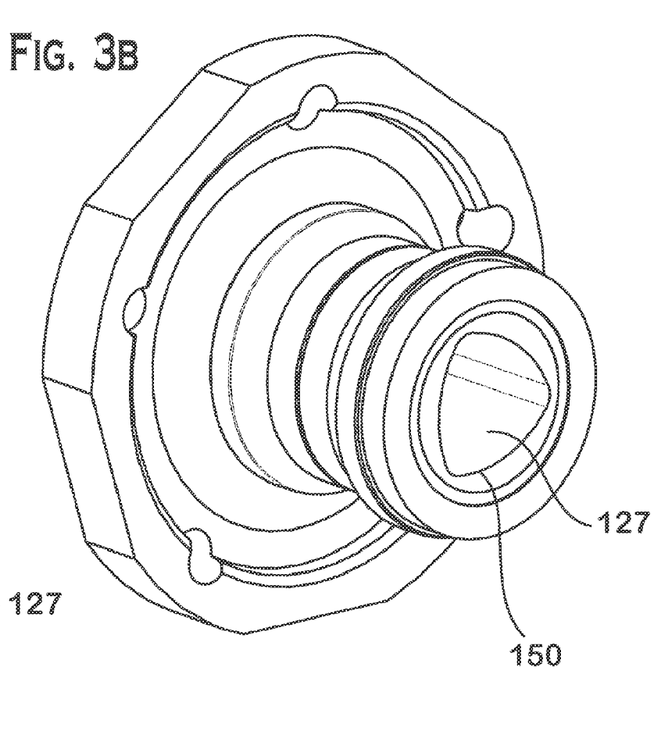

In one example of a wheel bearing unit according to the second embodiment of the invention, of the type shown in FIG. 2, the locking ring 145 comprises a drive geometry on its axially inboard face. The drive geometry can consist of e.g. radially oriented splines that are adapted to engage with corresponding radial splines on a constant velocity joint. Alternatively, the second section 135 of the inner member 105 may incorporate means to enable the transfer of torque to the vehicle wheel. For example, as shown in FIG. 3a, the bore 127 of the bearing unit may comprise longitudinal splines 147 that are adapted to engage with a correspondingly splined drive shaft of a CV joint. Alternatively, as shown in FIG. 3b, the bore 127 may have a non-circular geometry 150 to enable torque transfer by means of a drive shaft with a correspondingly non-circular cross-section. A non-circular bore has the further advantage of adding to the stiffness of the inner member 105. In a further development of the embodiments shown in FIGS. 3a and 3b, the bore 127 can be tapered relative to the bearing axis of rotation. The advantage of a tapered bore (and a correspondingly tapered drive shaft) is that play and backlash can be eliminated from the drive connection. As mentioned, the drive geometry in the second section of the inner member can be formed during the semi-solid metal process using a suitable die. This leads to substantial cost saving compared with e.g. machining a splined bore in a conventional wheel bearing unit.

In the embodiments discussed thus far, the inner member of the wheel bearing unit has been a hub element that is rotatable with the at least one bearing inner ring. As will be clearly understood, a bearing unit according to the invention may also be adapted for rotation of the outer bearing ring. An example of a wheel bearing unit of this kind is shown in cross-section in FIG. 4

As described before, the bearing unit 100''' comprises at least one bearing inner ring 110 that is mounted on the inner member 105. The inner member comprises a second section 135 made of a lightweight metal, whereby the second section 135 has been joined to the first section 130 by means of a semi-solid metal process. To provide a radial (and axial) interlock between the first and second sections, the first section 130 comprises a radially inwardly extending portion 140 according to the invention. In the example shown in FIG. 4, the inner member 105 is adapted to be mounted to a fixed suspension component of the vehicle and, accordingly, the second section 135 of the inner member 105 comprises a flange 160 at an inboard side, extending in a radially outward direction. The inboard flange 160 comprises connection means 181, e.g. threaded holes or stud bolts, to enable the flange 160 to be attached to be attached to e.g. a steering knuckle.

Figure 4:
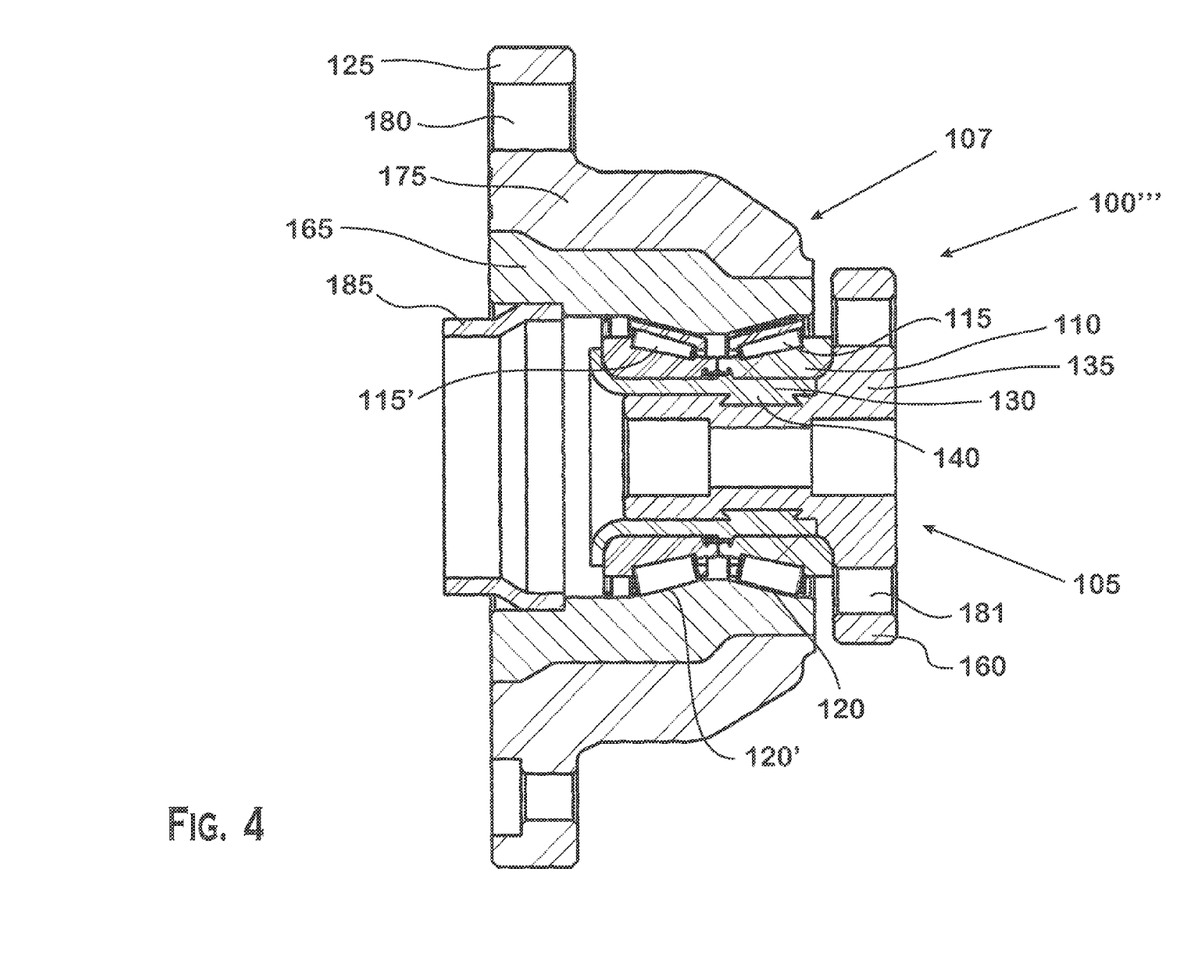
FIG. 4 shows a cross-sectional view of a bearing unit according to the second embodiment of the invention, adapted for rotation of the bearing outer ring.

In a further development of the invention, the weight of the wheel bearing unit is further reduced in that the outer bearing ring 107 also comprises a first section 165 and a second section 170, joined by means of a semi-solid metal process. The first section 165 of the bearing outer ring 107 has surfaces that serve as outer raceways 120, 120' for the rolling elements 115, 115' and, as described previously, the first section 165 is suitably made of e.g. a bearing grade steel. The second section 170 of the bearing outer ring 107 is formed from a lightweight metal; preferably aluminium.

A bearing outer ring formed in this way has further advantages. In addition to obtaining a lightweight bearing ring, the material of the first section receives a pre-stress due to the semi-solid joining process. As the semi-solid metal cools, it contracts around the first section or raceway section. The contraction also results in a robust and permanent join between the first and second sections.

In the example shown, the second section 170 of the bearing outer ring 107 comprises a radial extension at an outboard side, which functions as the wheel mounting flange 125, and comprises connection means 180 to enable the attachment of a vehicle wheel. To facilitate centring of the vehicle wheel, the unit 100''' further comprises a separate spigot 185 that is attached to the outer ring 107 by means of e.g. a press fit between an outer diameter of the spigot and an inner diameter of the bearing outer ring. Alternatively, the first section 165 of the outer ring 107 may comprises an integrally formed spigot. A wheel bearing unit as shown in FIG. 4 can be adapted for driven or non-driven applications. A wheel bearing unit that is adapted for rotation of the bearing inner ring may likewise comprise an outer bearing ring that is formed from first and second sections joined by means of a semi-solid metal process.

Figure 5:
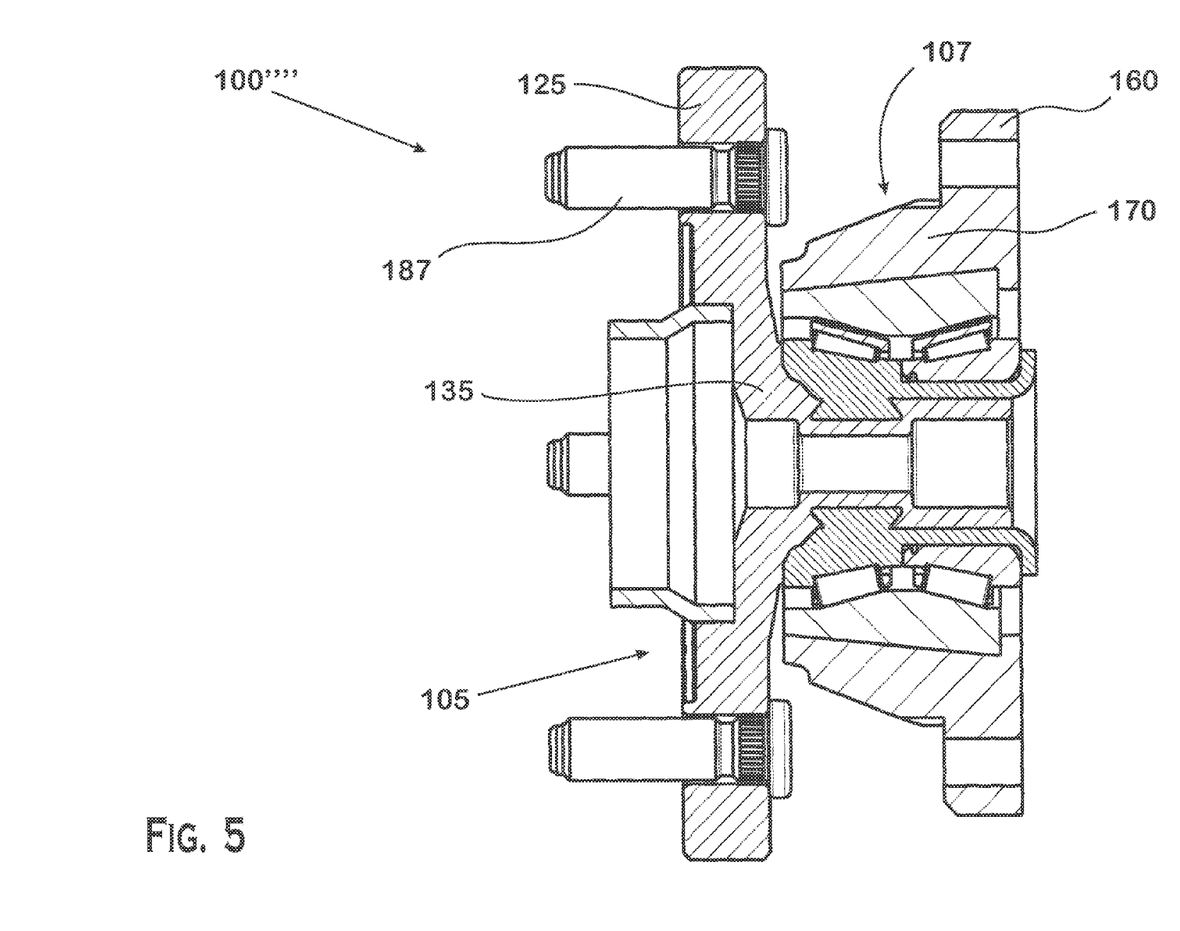
FIG. 5 shows a cross-sectional view of a further example of a bearing unit according to the first embodiment of the invention.

For example, FIG. 5 is a cross-sectional view of an example of a wheel bearing unit according to the first embodiment of the invention. In this example, the second section 135 of the inner member 105 comprises the wheel mounting flange 125 and is provided with stud bolts 187 for the attachment of the vehicle wheel. The second section 170 of the bearing outer ring 107 comprises an inboard flange 160, to enable the unit 100'''' to be coupled to e.g. a steering knuckle.

Figure 6:
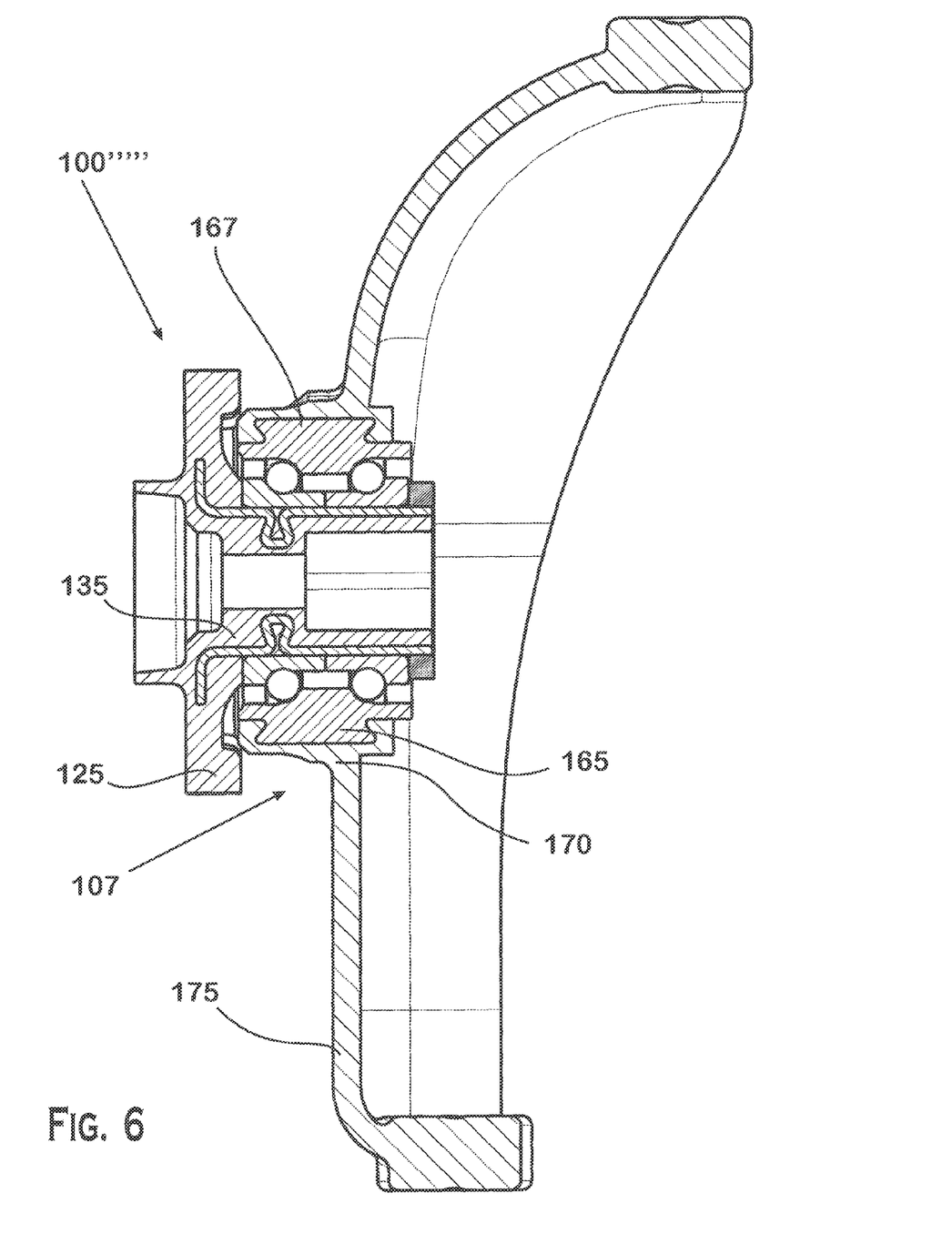
FIG. 6 shows a cross-sectional view of a further example of a bearing unit according to the second embodiment of the invention.

In a still further development of the invention, the second section of the bearing outer ring comprises the steering knuckle. An example of such a wheel bearing unit according to the second embodiment of the invention is shown in cross-section in FIG. 6. The steering knuckle 175 is made of a metal such as aluminium and is formed to the required shape and joined to the first section 165 of the bearing outer ring 107 in e.g. a rheocasting process. In the depicted example, the first section 165 of the bearing outer ring 107 comprises a portion 167 extending in a radially outward direction, which provides axial locking between the first and second sections 165, 170 of the bearing outer ring. Radial locking is not essential, given that as the second section 170 of the bearing outer ring cools, it contracts against the first section 165. After cooling, the surfaces of the first section 165 that serve as outer raceways are induction hardened and ground, ready for final bearing assembly. The steering knuckle 175 can suitably incorporate provisions for the attachment of a fixed brake calliper or a floating brake calliper. Moreover, the second section 135 of the inner member 105 can comprise a first radial extension 125, that serves as the wheel-mounting flange, and a second radial extension. The second radial extension lies axially inward and radially outward of the first radial extension 125, and can serve as a brake rotor adapted for a floating brake calliper or a fixed brake calliper. Thus, a bearing unit according to the invention can be assembled as an entire wheel end unit, which not only maximizes weight reduction, but also simplifies and speeds up the vehicle assembly procedure.

Wheel bearing units in numerous designs can be executed in accordance with the invention. For example, the bore of the inner member can serve as an outer raceway for rolling elements of a constant velocity joint and the unit can comprise an integral CV joint. Moreover, the bearing unit can be a single row or a double-row angular contact bearing in which the rolling elements are balls, rollers, flattened balls etc. Also, when the unit is a double-row bearing, the raceways for the first and second rows of rolling elements can be equal in diameter, or the diameter can differ.

A number of aspects/embodiments of the invention have been described. It is to be understood that each aspect/embodiment may be combined with any other aspect/embodiment. Moreover the invention is not restricted to the described embodiments. While a bearing unit according to the invention is advantageous when executed as a wheel bearing unit for automotive applications, other types of flanged and non-flanged bearing units for industrial applications may also be executed according to the invention. The invention may thus be varied within the scope of the accompanying patent claims.

REFERENCE NUMERALS

**100, 100', 100", 100'",
100"", 100'""** Wheel bearing unit according to the invention
105 Inner member
107 Bearing outer ring
110 Bearing inner ring
115, 115' $1^{st}, 2^{nd}$ row of oiling elements
117, 117' $1^{st}, 2^{nd}$ inner raceway
120, 120' $1^{st}, 2^{nd}$ outer raceway
125 Outboard flange (wheel-mounting flange)
127 Bore
130 First section of inner member
135 Second section of inner member
140 Inwardly extending portion of first section
142 Radial extension of first section
143 Inboard axial extension of first section
144 Inboard axial extension of second section
145 Locking ring
147 Longitudinal splines
150 Non-circular drive geometry of bore
155 Flange stiffening rib
160 Inboard flange
165 First section of bearing outer ring
167 Outwardly extending portion on first section of bearing outer ring
170 Second section of bearing outer ring
175 Steering knuckle
180 Connection means (outboard flange)
181 Connection means (inboard flange)
185 Spigot
187 Stud bolt
$S_O$ Overhanging surface on first section of inner member
$S_U$ Undercut surface on first section of inner member
$P_1, P_2$ Points on surface of inwardly extending portion
n Normal vector
r Radial vector
X Axis of rotation

The invention claimed is:

1. A bearing unit, wherein the second section of the inner member has at least one radially extending flange configured to connect with a vehicle wheel comprising:
   an inner member including a first section and a second section, at least part of the second section being disposed radially inwardly of the first section, the first section being formed of a first material and the second section being formed of a second, metallic material joined to the first section by means of a semi-solid metal process,
   an outer member,
   at least one row of rolling elements rotationally coupling the inner and outer members, and
   a bearing inner ring mounted on the inner member, the bearing inner ring providing at least part of an inner raceway for the at least one row of rolling elements,
   wherein the bearing unit has an axis of rotation and the first section of the inner member has a portion extending in a radially inward direction and defining an interface with the second section of the inner member, at least one surface of the portion of the first section portion facing away from the axis of rotation of the bearing unit, wherein
   the second section of the inner member has a radially extending flange configured to connect with a vehicle wheel, and wherein
   the first section of the inner member includes a flange-reinforcing radial extension.

2. The bearing unit according to claim 1, wherein the first section of the inner member has a surface providing at least part of the inner raceway.

3. The bearing unit according to claim 1, wherein the first section of the inner member is formed of one of a bearing grade steel and a ceramic material.

4. The bearing unit according to claim 1, further comprising at least one other bearing inner ring is mounted on the inner member.

5. The bearing unit according to claim 4, wherein the first section of the inner member is formed of a low-carbon steel.

6. The bearing unit according to claim 5, further comprising a locking ring welded to the first section of the inner member.

7. The bearing unit according to claim 1, wherein the second section of the inner member has a non-circular bore.

8. The bearing unit according to claim 1, wherein the radially extending flange has an axial stiffening rib located at a circumferential periphery of the flange and oriented in an inboard direction.

9. The bearing unit according to claim 1, wherein the radially extending flange includes a first radial extension configured to connect with the vehicle wheel and a second radial extension adapted to function as a brake rotor.

10. The bearing unit according to claim 1, wherein the second section of the inner member has an inboard side and includes a radially extending flange at the inboard side, the flange being configured to connect the inner member to a vehicle suspension component.

11. The bearing unit according to claim 1, wherein the second section of the inner member is formed of one of aluminium and an aluminium alloy.

12. The bearing unit according to claim 1, wherein the outer member includes a first section formed of a first material and a second section formed of a second, metallic material joined to the first section by means of a semi-solid metal process, the second section being disposed radially outward of the first section.

13. The bearing unit according to claim 12, wherein the second section of the outer member includes a radially extending flange configured to connect with a vehicle wheel.

14. The bearing unit according to claim 12, wherein the second section of the outer member has an inboard side and includes a radially extending flange at the inboard side, the flange being configured to connect the outer member with vehicle suspension component.

15. The bearing unit according to claim 12, wherein the second section of the outer member includes an integrally formed suspension component for one of a steerable vehicle wheel and non-steerable vehicle wheel.

16. The bearing unit according to claim 12, wherein the second section of the outer member is formed of one of aluminium and an aluminium alloy.

17. The bearing unit according to claim 1, wherein the semi-solid metal process is one of a thixoforming process, a thixocasting process, a thixoforging process, a thixojoining process, a rheoforming process, a rheocasting process, a rheoforging process, and a rheojoining process.

18. The bearing unit according to claim 1, wherein the at least one row of rolling elements is one of a single row of rolling elements and two rows of rolling elements.

* * * * *